April 26, 1927.
J. H. CRESMER
1,626,331
AUTOMOBILE STEERING KNEE CONTROL
Filed Feb. 11, 1926
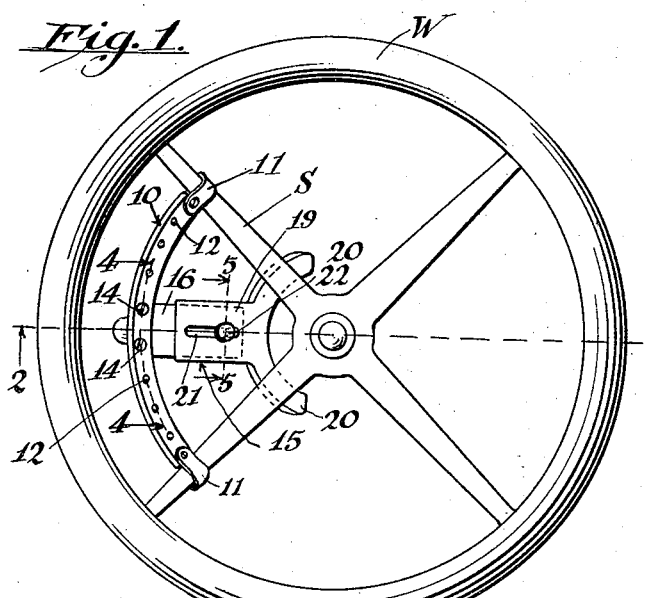
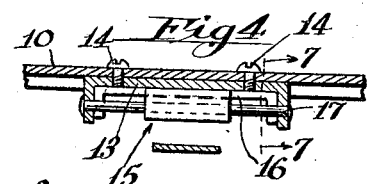
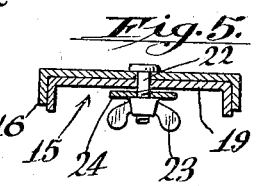
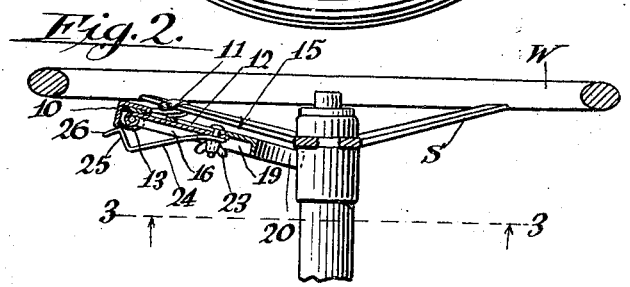
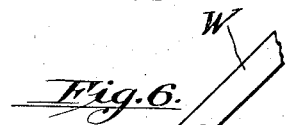
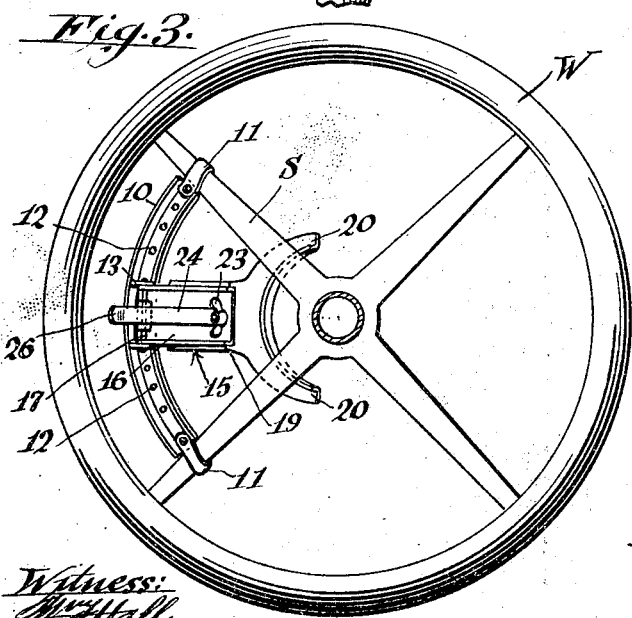
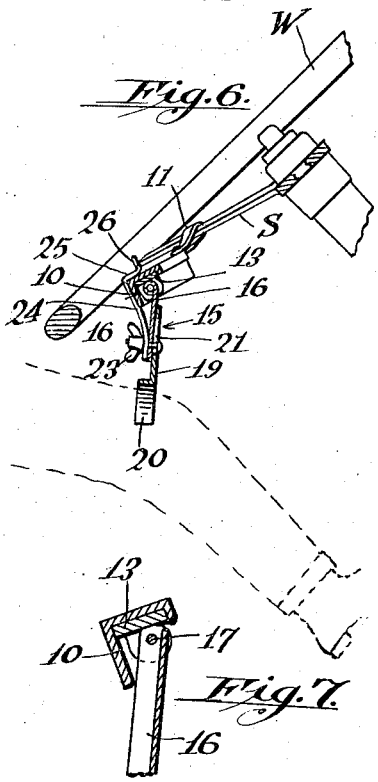
Inventor:
John H. Cresmer.
by Hazard and Miller
Attorneys.
Witness:
W. Hall Patented Apr. 26, 1927.

1,626,331

UNITED STATES PATENT OFFICE.

JOHN H. CRESMER, OF RIVERSIDE, CALIFORNIA.

AUTOMOBILE STEERING KNEE CONTROL.

Application filed February 11, 1926. Serial No. 87,592.

This invention relates to improvements in devices for controlling and turning vehicle steering wheels.

An object of this invention is to provide an improved device, which can be attached to a vehicle steering wheel which will enable the driver to hold the steering wheel stationary or to turn it by his knee, so that it is possible for him to temporarily use his hands for other purposes.

Another object of this invention is to provide an improved vehicle steering wheel control which is of improved construction, having several adjustments, and which may be easily constructed and applied to the steering wheel.

A further object of this invention is to provide a device of the character above referred to, which can be collapsed or swung into an inoperative position, and which is quite out of the way when not in use.

With the foregoing and other objects in view which will be made manifest in the following detailed description and specifically pointed out in the appended claims, reference is had to the accompanying drawings for an illustrative embodiment of the invention, wherein:

Figure 1 is a top plan view illustrating the improved device in applied position thereon, the arm being swung into collapsed or inoperative position, Fig. 2 is a vertical section taken on the line 2—2 of Fig. 1, Fig. 3 may be considered as a horizontal section taken upon the line 3—3 of Fig. 2 in the direction indicated, Fig. 4 is a sectional view taken upon the line 4—4 of Fig. 1, Fig. 5 is a sectional view taken on the line 5—5 of Fig. 1, Fig. 6 is a partial view in side elevation illustrating the manner in which the device is used, and Fig. 7 is a vertical section taken substantially on the line 7—7 of Fig. 4.

Referring to the accompanying drawings wherein similar reference characters designate similar parts throughout, the improved steering knee control consists of an arcuate, inverted channel-shaped member 10, preferably formed of sheet metal and which has metallic attaching straps 11 provided at its ends for attaching the device to the spokes S of the steering wheel W of a vehicle. The top of the inverted channel-shaped member 10 has a plurality of apertures 12 formed in it, which are equally spaced apart, and on the underside of the channel-shaped member there is positioned a bracket 13. Screws 14 pass through two apertures 12 and into the bracket 13 so as to secure the bracket adjustably to the member 10. As these screws are receivable in any of the apertures 12, it will be readily understood that it is possible to adjust the position of the bracket 13 circumferentially to the axis of the steering wheel along the member 10.

An arm, generally designated at 15, consists of two channel-shaped parts, one of which is indicated at 16, and is hingedly connected to the bracket 13 as by a pin 17. The pin 17 extends through the depending flanges at the sides of the part 16 and is also partially enclosed by a curled portion of the top of the part 16. The ends of the depending flanges on the part 16 are formed to provide stops engageable upon the top of the bracket 13, as clearly illustrated in Fig. 7, to limit the downward swinging movement of the arm 15.

The other part of the arm 15 is indicated at 19 and is slidable over the part 16. It has two divergent fingers 20, between which may be positioned the lower limb or knee of the driver of the vehicle. The part 19 has a slot therein indicated at 21 and a bolt 22 extends through this slot and through the member 16. The bolt is tightened as by a wing nut 23, and, when loosened, it enables the part 19 to be adjusted relatively to the part 16. A leaf spring 24 has an aperture in one end thereof through which the bolt 22 extends, and the other end of the leaf spring is bent upwardly as at 25 and outwardly as at 26. This leaf spring is held in place against the under side of the part 16 by the wing nut 23. As clearly shown in Fig. 2, the arm 15 can assume a position approximately in the plane of the steering wheel W beneath the spokes S. It is maintained in such position because of the engagement between the free end of the spring 24 with the lower edge of one of the depending flanges of the inverted channel-shaped member 10. By swinging the arm 15 downwardly, the spring 24 will ride over this edge and will allow the arm to assume a position as shown in Fig. 6 with the upwardly bent portion 25 of the spring 24 engaging upon the top of the member 10, locking the member in the position shown. When the arm is so locked, the driver may place his knee between the fingers 20 and thus keep the steering wheel stationary, or the wheel can be turned slightly by his knee while he is using his hands for other purposes.

From the above described construction it will be readily appreciated that the improved steering wheel knee control can be easily, quickly and cheaply manufactured and can be very easily applied. Furthermore, it can be swung into operative and inoperative positions, and when it is in an inoperative position, it is completely out of the way. The purpose of providing for the adjustment of the bracket 13 along the member 10 is for the reason that the position of the spokes S of the steering wheel, when the vehicle is moving straight forwardly, may vary on different vehicles. The adjustment of the arm 15 enables the fingers 20 to be engaged by the knee of various drivers.

It will be understood that various changes in the detail of construction may be made without departing from the spirit or scope of the invention as defined by the appended claims.

I claim:

1. A device of the class described comprising a member having attaching parts at its ends permitting it to be attached to the spokes of a steering wheel, an arm hingedly and adjustably connected to said member so as to be capable of being swung downwardly into a position capable of being engaged by the lower limbs of the driver or to be swung upwardly into a position adjacent the spokes, and means for positively locking said arm in either of said positions.

2. A device of the class described comprising an arcuate member having attaching parts at its ends providing for attachment to the spokes of a steering wheel, a bracket secured to said member, means for securing said bracket to said member providing for its adjustment circumferentially along the member, and an arm secured to said bracket capable of being engaged by the lower limbs of the driver.

3. A device of the class described comprising an arcuate member having attaching parts at its ends providing for attachment to the spokes of a steering wheel, a bracket secured to said member, means for securing said bracket to said member providing for its adjustment circumferentially along the member, and an arm hingedly secured to said bracket capable of being swung downwardly into a position whereby it is capable of being engaged by the knee of the driver or of being swung upwardly into a position adjacent the spokes of the steering wheel.

4. A device of the class described comprising an arcuate member having attaching parts at its ends providing for attachment to the spokes of a steering wheel, a bracket secured to said member, means for securing said bracket to said member providing for its adjustment along the member, an arm hingedly secured to said bracket capable of being swung downwardly into a position whereby it is capable of being engaged by the knee of the driver or of being swung upwardly into a position adjacent the spokes of the steering wheel, and a leaf spring secured to said arm engageable upon said member urging said arm into either of the mentioned positions.

5. A device of the class described comprising an arcuate member having attaching parts at its ends providing for attachment to the spokes of a steering wheel, a bracket secured to said member, means for securing said bracket to said member providing for its adjustment along the member, an arm hingedly secured to said bracket capable of being swung downwardly into a position whereby it is capable of being engaged by the knee of the driver or of being swung upwardly into a position adjacent the spokes of the steering wheel, a leaf spring secured to said arm engageable upon said member urging said arm into either of the mentioned positions, and means associated with said spring for locking said arm in either of said positions.

In testimony whereof I have signed my name to this specification.

JOHN H. CRESMER.